Figure 7:
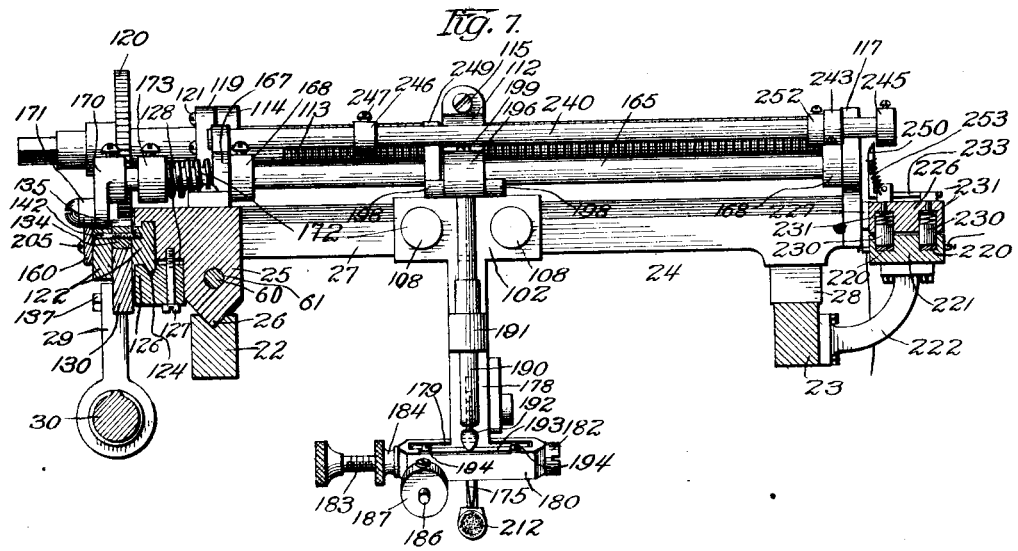

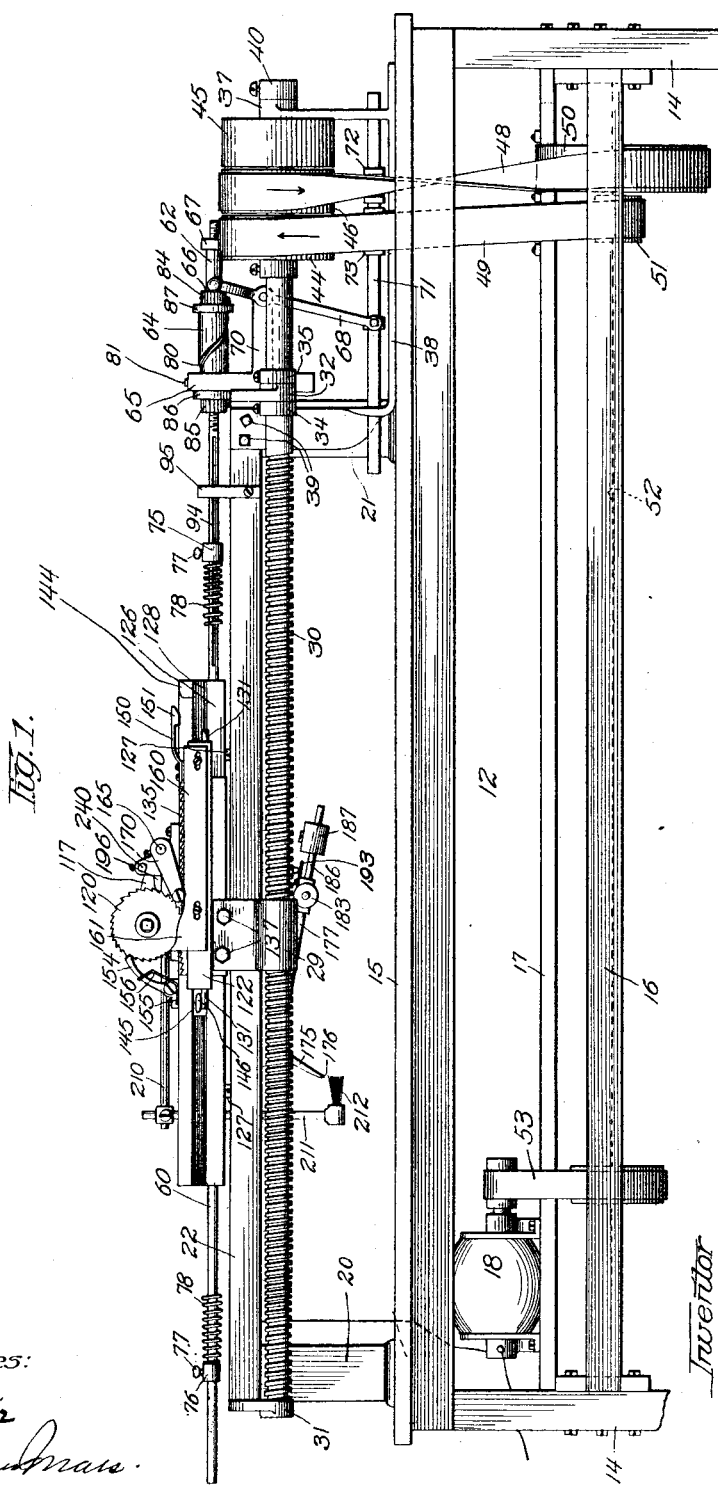

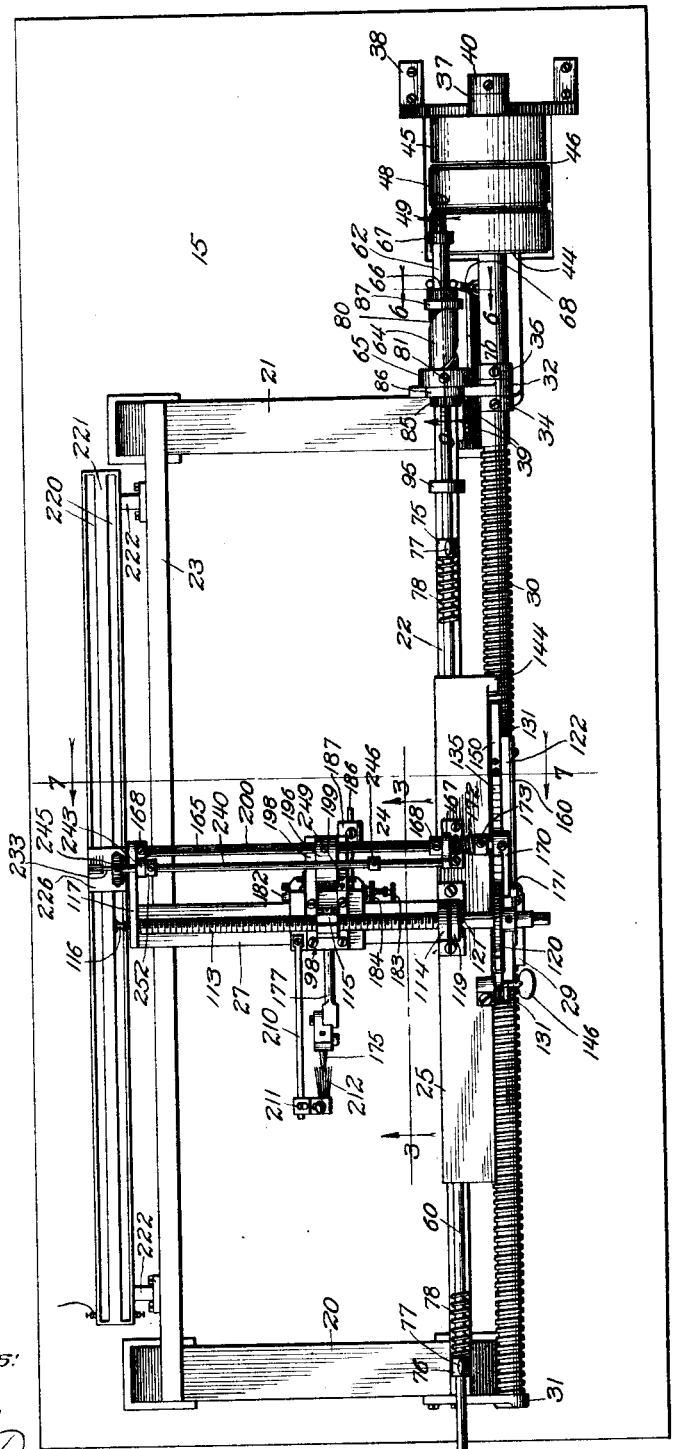

N. W. VON HOLDT.
RULING DEVICE.
APPLICATION FILED OCT. 16, 1911.
1,118,082.
Patented Nov. 24, 1914.
4 SHEETS—SHEET 3.
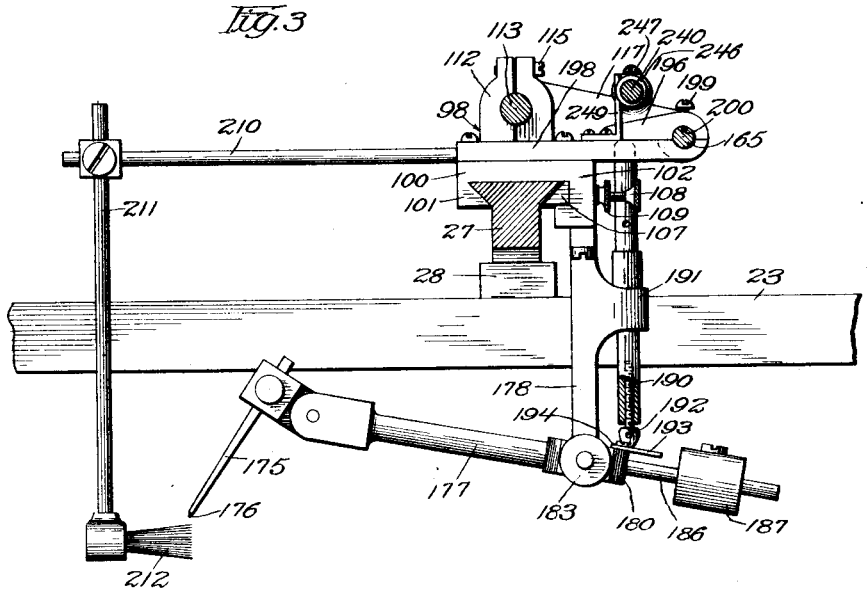
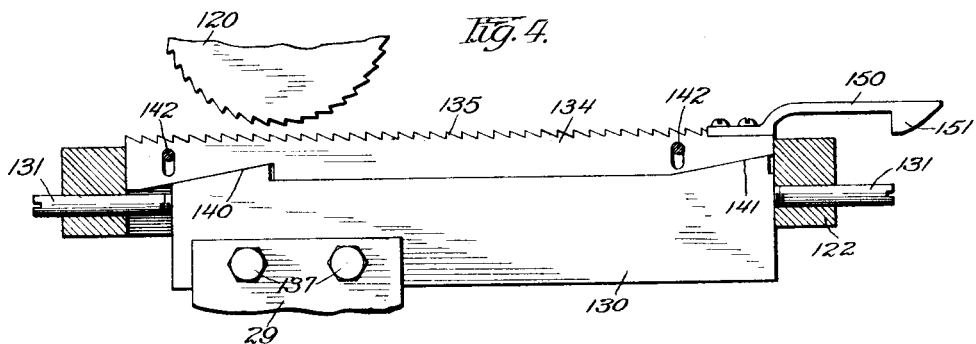
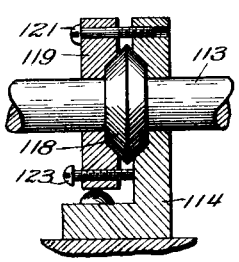
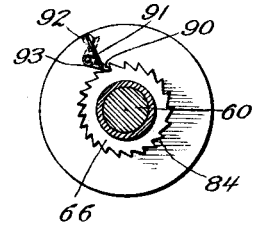
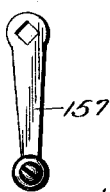

N. W. VON HOLDT.
RULING DEVICE.
APPLICATION FILED OCT. 16, 1911.

1,118,082.

Patented Nov. 24, 1914.
4 SHEETS—SHEET 4.

Witnesses:
R. H. Weir
Leo J. Omair

Inventor:
Norbert Wm. von Holdt.
by Hirsch & Hirsch
Attys.

UNITED STATES PATENT OFFICE.

NORBERT WM. von HOLDT, OF CHICAGO, ILLINOIS.

RULING DEVICE.

1,118,082.   Specification of Letters Patent.   Patented Nov. 24, 1914.

Application filed October 16, 1911. Serial No. 654,901.

*To all whom it may concern:*

Be it known that I, NORBERT WM. VON HOLDT, a citizen of the United States, residing in Chicago, county of Cook, and State of Illinois, (whose post-office address is 4329 Jackson Boulevard,) have invented new and useful Improvements in Ruling Devices, of which the following is a specification.

It will be understood by those familiar with the art of lithographing that in preparing the surface of a stone for making lithographs it is often necessary, as a step in the process, to inscribe upon the surface of the stone a large number of straight, evenly spaced parallel lines. Such lines are ordinarily made by a diamond, or by a sharp pointed tool, or other implement, and devices have heretofore been employed for guiding the hand of the operator in moving the drawing implement over the surface of the stone to make the lines as required.

The present invention has for one of its objects the production of a device for performing the entire operation of ruling and properly spacing a number of parallel lines upon a lithographing stone or other surface, which device shall be mechanically actuated and entirely automatic in its operation and shall require no attention other than its proper adjustment and initial setting at the beginning of its operation.

A machine embodying the principles of the present invention is herein illustrated as especially designed and adapted for ruling lines upon hard surfaces such as lithographing stones, and is shown as equipped with a diamond point for such purpose; but the operative parts of the device are equally adapted for carrying marking or engraving tools or implements of other forms, for ruling lines upon surfaces of other characters and of other material, such as sheets of paper, metal plates, and the like; and for employment in mechanical arts other than the art of lithographing.

Figure 8:
Figure 9:
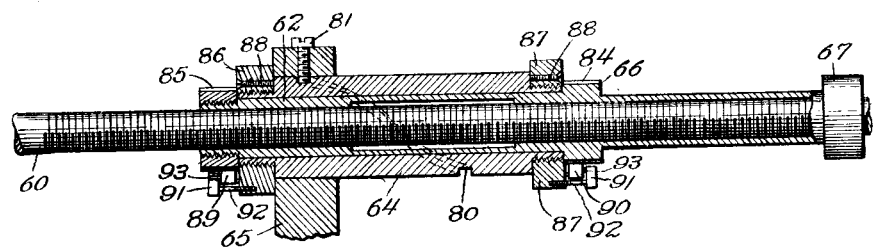

The device here shown comprises, in general terms, a frame somewhat in the form of a table having a flat top upon which is laid the lithographing stone or other material to be operated upon. Somewhat above the table top are arranged horizontal rails supporting a longitudinally sliding carriage; and the latter in turn carries a transverse rail supporting a transversely sliding, or cross-sliding carriage to which is fixed the ruling implement, or stylus. Means are provided for shifting the longitudinally sliding carriage backward and forward upon its rails to carry the stylus over the surface of the work and draw the lines; and for periodically moving the cross-sliding carriage along its rail in order to space the lines the proper distance apart. These parts and others are shown in the accompanying drawings in which:

Figure 1 is a view in side elevation showing a machine embodying the principles of the present invention. Fig. 2 is a top plan view thereof. Fig. 3 is a vertical section on the line 3—3 of Fig. 2; Fig. 4 is a view in side elevation of the sliding link and its associated parts removed from the machine. Fig. 5 is a vertical section through one of the bearings of the cross-feeding screw. Fig. 6 is a vertical section on line 6—6 of Fig. 2, but showing the parts in an altered position. Fig. 7 is a vertical section on line 7—7 of Fig. 2. Fig. 8 is a top plan view of the sliding link forming a part of the device, removed from the machine. Fig. 9 is a vertical section on line 9—9 of Fig. 2. Fig. 10 is a view of a small hand crank used in connection with the device.

As shown in said drawings, 12 indicates as a whole a frame in the general form of a table comprising supporting members or legs 14, 14, a flat top 15, and stiffening members or braces 16, and 17, the latter being made in the form of a shelf upon which may be mounted a motor 18 for driving the machine. The flat top 15 is designed to support the material, such as a lithographing stone upon which it may be desired to operate; and above such top is arranged the marking implement and its operating parts in such manner that the implement may be moved backward and forward over the stone in the desired manner. Accordingly there are placed near the foot of the table top 15, and a somewhat greater distance from the head, a pair of supporting members, 20 and 21 respectively, in the form of low walls across the tops of which are laid horizontal rails 22 and 23, supporting a longitudinally sliding carriage 24 (Fig. 2). The latter, as viewed in top plan view, is T-shaped, comprising a long, solid, head portion 25 with its lower edge 26 wedge-shaped and resting in a correspondingly shaped longitudinal groove in the rail 22, and a long transverse arm 27 with its farther end supported by a sliding shoe 28 which rests on the flat rail 23. Mounted in the carriage 24 and depending therefrom is a bracket 29, the lower part of which is cylindrically enlarged and provided with an internally threaded opening in the form of a nut to engage with a long threaded shaft or screw 30, designed to rotate and thereby move the carriage along its rails. Said screw is journaled at its ends in bracket members, or hangers, 31 and 32, bolted respectively to the faces of the walls 20 and 21; being provided with thrust collars or flanges 34 and 35, engaging with the journal member 32. It is extended beyond the journal member 32 in the form of a short shaft supported at its outer end in a journal member 37, which latter rises from a base plate 38 bolted flat upon the table top and upturned at its end and secured by bolts 39, 39 to the wall 21 for additional support. An additional thrust collar 40 is placed upon the end of the shaft extending beyond the journal 37; and between the journals 32 and 37 there are mounted upon said shaft two loose pulleys, 44 and 45, and an intermediate fixed pulley or tight pulley 46. The latter are designed for engagement by crossed and uncrossed belts, 48 and 49 respectively, which belts are in turn driven by a pair of belt pulleys 50 and 51 fixed to a horizontal shaft 52 lying below the table 12 and journaled at its ends in the legs 14; said shaft being driven by a belt 53 and pulleys from the motor 18, as shown.

Means are provided for shifting the belts 48 and 49 in order that one of them may engage with the tight pulley 46 while the other is running idly upon one of the loose pulleys; whereby the screw 30 is rotated first in one direction and then in the opposite direction. Said means are constructed as follows: 60 indicates a long horizontal, longitudinally arranged, non-rotative shaft or shifting bar extending entirely through an opening 61 (Fig. 7) in the head portion 25 of the carriage 24. Its head end is threaded and screwed into a tube 62, which latter in turn is surrounded by a heavy walled tube or cylinder 64, journaled in a bearing member 65 rising from the face of the wall 21. The form and purpose of the tube 62 and cylinder 64 will be more fully described below, it being sufficient to state here that the tube is extended beyond the cylinder 64 and provided with a pair of radial flanges 66 and 67 in the form of thrust collars engaging with the forked upper end of a vertical shifting lever 68 for operating the belt shifting devices. Said lever is fulcrumed near its upper end in a bracket member 70 secured to the outer face of the wall 21, and upon its lower end is hung a shifting rod 71 to which are fixed pairs of shifting forks 72 and 73 engaging the belts 48 and 49. The two arms of the lever 68 are proportioned as suggested above in order that a small movement of its upper end may cause a large movement of its lower end; and the two flanges 66 and 67 are spaced somewhat farther apart than the width of the shifting fork in order that at each operation the tube 62 may move some distance before engaging with the lever 68, as will appear below. Longitudinally adjustable collars 75 and 76 are placed upon the shifting bar 60, each being provided with a set screw 77 for securing it in its proper position upon the bar and being engaged by the traveling carriage 24 through the intermediary of coiled springs 78, 78. The latter yieldingly transmit the thrust of the carriage to the collars 75 and 76 and serve the double purpose of lessening jars upon the apparatus and also of continuing the movements of the shifting bar 60 a short distance at the end of each stroke after the carriage 24 has ceased its travel; in order that each belt may be shifted completely from one pulley to another, and may not be left partly on one and partly on another. The cylinder 64, besides being rotatively mounted in the journal member 65, is left free to slide endwise therein, and in its outer surface is cut a spiral groove 80 which is engaged by an inwardly extending pin 81, fixed in the journal member; whereby the backward and forward sliding movement of the cylinder 64 through its journal will cause the cylinder to rotate first in one direction and then in the other. This reciprocal rotary movement of the cylinder 64 is utilized to periodically rotate the tube 62 in either direction as desired and thereby cause the bar 60, by reason of its threaded engagement therewith, to be shifted to the right, or left, as the case may be, in order to continuously increase the distance of travel of the carriage 24 in succeeding strokes in one direction, and correspondingly shorten its distance of travel in the opposite direction. For such purpose the flange 66 is made with ratchet teeth 84 upon its periphery and a similar flange 85, likewise toothed, is rigidly fixed upon the inner end of the tube 62.

Upon the adjacent ends of the cylinder 64 are placed right and left operating pawls, either of which may be placed in its operative position to engage with one of the toothed flanges 66 or 85 and rotate the tube 62 during the corresponding rotation of the cylinder. More particularly described, the two ends of the cylinder 64 are reduced in diameter and threaded, and upon such reduced portions are screwed collars, or rings, 86 and 87, each being fixed in place by a set screw 88. On the face of the ring 86 is pivoted the pawl 89; and the ring 87 carries the pawl 90. The pawls are arranged to be yieldingly pressed inward by flat springs 91, (Fig. 6) fixed in studs 92 projecting from the faces of the two rings, and engaging with pins 93 on each pawl. Either pawl may be thrown out of its operative position by turning it outward upon its pivot until the pressure of its spring 91 acts upon it in the opposite direction, as shown by the dotted lines in Fig. 6, where it will rest against the corresponding stud 92 and remain out of engagement with the ratchet teeth. The shifting bar 60 is prevented from rotating by means of a long key-way 94 in its surface engaged by a pin extending inward from a post 95 through which such bar extends; and the tube 62 is prevented from rotating during the idle movement of the cylinder 64 by its frictional engagement with the threaded bar 60. By this means it will be seen that the screw 30, driven by the tight pulley 46, will operate to slide the carriage 24 along its rails, and that when such carriage has neared the end of its stroke it will engage one of the springs 78 and compress the same until the inertia of the bar 60 and its associated parts, and the friction of the rotating surfaces has been overcome, when the further movement of the carriage will operate to shift the bar 60 with its tubular extension 62. The latter, engaging through one of its flanges, 66 or 67, with the forked upper end of the shifting lever 68, will swing such lever and shift the belts 48 and 49 for a reverse movement of such carriage; but because of the distance between the flanges 66 and 67 such engagement of the tube 62 with the shifting lever will not take place until the tube and cylinder have moved longitudinally a sufficient distance to rotate such cylinder and, through one of the pawls 89 and 90, likewise the threaded tube, to vary the longitudinal position of the shifting bar 60. This continuous changing of the position of the bar 60, and consequent lengthening of the distance of travel of the carriage in one direction before striking the corresponding spring 78 and shortening of the distance of its travel in the opposite direction, permits of the ruling of parallel lines or cuts all of equal length but beginning progressively farther to the right, or left, as the case may be, of a perpendicular from some point in the first line, as when the lines are ruled diagonally to one of the margins of the stone or other piece of work. Or, if it is desired that the ruled lines shall terminate in points lying in perpendicular lines, the pawls 89 and 90 are both engaged with the ratchet teeth; whereby the longitudinal displacement of the shifting bar 60 at one stroke of the carriage 24 will be restored by the reverse stroke, and succeeding complete strokes of the sliding carriage 24 will not operate to vary the position of the shifting bar, but the latter will operate, at each movement of the carriage 24, at the same point relative to the stroke of the latter.

Referring now to the longitudinally reciprocating carriage 24, the transverse arm 27 is made somewhat in the form of a T-rail (see Fig. 3), its top surface being widened to support a transversely sliding carriage 98, and diagonally undercut to provide engaging surfaces for such carriage and prevent it from leaving its rail. The carriage 98 comprises a base plate 100 resting on the rail 27 but made somewhat wider than the top of the rail and having at one side a depending flange 101 which is suitably shaped to engage with the diagonally undercut surface of the rail head. A somewhat deeper flange 102 at the opposite margin of the base plate 100 is provided with a horizontal groove in its inner face, in which groove is fitted a wedge-shaped block 107 engaging with the other side of the rail 27. Adjusting screws 108, provided with set nuts 109, extend through the flange 102 and bear against the block 107 to press it against the rail and compensate for wear.

From the foregoing it will be seen that the carriage 98 is adapted to slide transversely along the rail 27, and such transverse movement, or cross-feeding, is accomplished as follows: Rising from the carriage 98 is a projection 112 having a transverse, internally threaded opening in the form of a nut to engage with a long, transversely arranged, horizontal, threaded shaft or screw 113. Said screw is journaled at one end in a journal member 114 resting upon the frame member 25 and its opposite end is suitably recessed and engaged by a pointed screw 116 to form an adjustable cone bearing for such end; said screw 116 being threaded through a vertical flange 117 rising from the end of the rail 27. In order to provide against lost motion between the screw 113 and the nut 112 the latter is split, its two parts being drawn together by a screw 115 as shown; and careful provision is also made against lateral displacement of the screw 113, which would interfere with the proper spacing of the lines. Accordingly the shaft 113 is made with an integral beveled thrust collar 118 (Fig. 5), adapted to engage with the journal member 114; and the opposite face of said thrust collar engages with the inner face of a disk 119 secured to the adjacent face of the member 114 by screws 121. Other screws 123 extend through the disk and provide for the proper spacing apart of the disk 119 from the journal member 114; whereby these parts may be adjusted to compensate for wear and the shaft 113 will be accurately maintained in its proper relation to the other parts.

A ratchet wheel 120 is fixed to the outer end of the shaft 113 and is periodically rotated by parts having limited sliding engagement with the frame member 25 and intermittently operated through the movements of the bracket 29 above described; which latter, instead of being fixed to the frame member 25 or other solid portion of the traveling carriage 24, is fixed to one of such relatively movable parts. As best shown in Figs. 4, 7 and 8, 122 indicates a sliding block arranged in a recess in the side of the frame member 25 and free to slide longitudinally in such recess. The block 122 is formed along its inner margin with a depending vertical flange 124 having its lower edge wedge-shaped and resting in a corresponding groove in a shelf 126; which latter is fixed to the under surface of the frame member 25 and forms the bottom of said recess. The shelf is secured to the frame member by means of machine screws 127; and between the shelf and the underside of the frame member is placed a thin plate or "shim" 128 which determines the proper separation of these parts and the corresponding height of the recess. In the use of the machine, the shim 128 may be occasionally filed down, or replaced by a thinner plate, permitting the screws 127 to be tightened to compensate for wear. The block 122 is longitudinally slotted, and within its slot is arranged a second sliding block 130 which is free to slide longitudinally within the first block, being guided by rods or studs 131 extending through the end walls of such slotted block and fixed in the ends of the block 130; and above the block 130 and normally resting upon it is a rack bar 134 likewise arranged within the slotted block 122 and having upon its upper surface ratchet teeth 135 adapted to engage with the ratchet wheel 120. The bracket member 29 above mentioned is fixed by means of bolts 137 to the block 130; and on the upper surface of the latter are two wedge-like projections or cam surfaces, 140 and 141 respectively, which enter corresponding recesses in the lower surface of the rack bar.

Pins 142 are fixed in the inner side walls of the slotted block 122 and extend through vertical slots in the bar 134. By this means it will be seen that a sliding movement of the block 130 toward the left, as viewed in Fig. 4, to the end of its travel within the slotted block 122, will operate, through the cam surfaces 140 and 141, to raise the rack bar 134; and a further movement of the block 130 (and likewise of the slotted block 122 by reason of the engagement of the block 130 therewith) will operate to rotate the ratchet wheel 120; while a reverse movement of the block 130 within the slotted block will allow the rack bar to fall out of engagement with the ratchet wheel and the parts to be moved in the reverse direction without rotating the latter. The sliding movement of the slotted block 122 in its recess in the direction first mentioned is limited by a small block 145 in the form of an adjustable stop which slides within the recess in the same manner as does the block 122 and is provided with a set screw 146 for frictional engagement with the inner wall of said recess. Its movement in the opposite direction is limited by a small fixed block or stop 144 projecting from the end of the frame member 25. The operation of these parts is as follows: Upon each operation of the screw 30 to move the bracket 29 backward, or toward the left as viewed in Figs. 1 and 4, the block 130, sliding within the slotted block 122, will raise the rack bar 134 and cause it to mesh with the ratchet wheel 120; whereupon further movement of the inner and outer blocks, and through them the rack bar, will rotate the ratchet wheel and move the carriage 98 along its rail until further sliding of the slotted block 122 is prevented by the adjustable stop 145; when the carriage 24 will be shifted along its rails until it is brought into engagement with one of the springs 78 as above described. In order that a frictional engagement of the block 130 with the slotted block 122 may not operate to slide the latter without causing sufficient relative movement between the two blocks to raise the rack bar 134, the latter is provided with a projection 150 having at its end a trigger-shaped hook 151 adapted to engage with the small block 144 fixed to the adjacent end of the frame member 25. It will be seen therefore that when the hook 151 is engaged with its block 144 the rack bar will be prevented from sliding relative to the heavy carriage 24 until the sliding block 130 with its cam surfaces has raised it a sufficient distance to disengage the hook 151; at which position the rack teeth 135 will engage with the ratchet wheel as above described. The ratchet wheel 120 is prevented from opposite rotation by means of a pawl 154 pivoted in a small bracket 155 fixed upon the top of the frame member 25 and yieldingly pressed downward by means of a spring 156; and a reverse longitudinal movement of the sliding block 130 will allow the rack bar 134 to drop into its lower position (shown in Fig. 4) and slide with the slotted block 122 until the latter reaches the end of its stroke; when the hook 151 will be brought into engagement with the block 144 as above described. The end of the shaft 113 is squared to permit of the engagement of a small crank 157 (Fig. 10), by which it may be rotated by hand to secure the proper setting of the carriage 98 at the beginning of the operation. In addition to these parts there is secured to the sliding block 122 a flat plate 160 having upon its upper edge a peculiarly shaped cam surface 161 which operates, in a manner more fully described hereinafter, to raise and lower the marking implement from the surface of the work according to the direction of movement of the carriage 24. As best shown in Figs. 2, 3 and 7, 165 indicates a transverse shaft journaled at one end in an opening through the flange 117, above described, and at its other end passing through a journal member 167, with suitable thrust collars 168 to provide against lateral displacement. On its end is a crank arm 170 carrying a small roller 171 engaging with the cam surface 161 above described; said shaft being surrounded at its adjacent end portion by a coil spring 172 which tends to rotate it and operates to press the roller into yielding engagement with the cam. Said spring is fixed at one end to the bracket member 167 and at its other end to a collar 173 which is secured upon the shaft by a set screw as shown.

The marking implement 175 (best shown in Fig. 3) is provided at its lower end with a diamond point 176, and is secured at the end of a jointed arm 177 which is pivoted at the lower end of a post 178 depending from the frame member 100. The post 178 carries at its lower end a horizontal hub 179, and the arm 177 a cross yoke 180; and pointed screws extend through the ends of the latter and into corresponding depressions in the ends of the hub to form cone bearings upon which the arm is pivoted. One of said screws, 182, is fixed permanently into the end of the yoke 180; and the other, 183, is made with a knurled head and adapted for adjustment, being provided with a knurled lock nut 184. From the side of the yoke 180 opposite to the arm 177 extends a short arm 186 upon which is placed an adjustable counter-weight 187 for balancing the weight of the moving parts. A small vertically arranged sliding rod 190 is journaled in a projection 191 from the post 178, and into its lower end is threaded a screw 192, which may be adjusted to vary the effective length of said rod. Said screw has a large pointed head adapted for engagement with a flat plate 193, which is secured, as by screws 194, to the top side of the yoke 180 opposite to the arm 177; said sliding rod being operated through an arm 196 which extends radially from the shaft 165 and rests upon the upper end of said rod. The arm 196 is free to slide lengthwise upon its shaft and is moved along the latter, during the corresponding movement of the carriage 98, and prevented from disengagement with the vertical rod 190, by means of a pair of guide plates 198 which extend forward from the top of the base plate 100, one on either side of the hub portion of said arm. A small screw or pin 199 extends through the hub portion of the arm 196 and enters a corresponding key-way 200 cut along substantially the entire length of the shaft 165, whereby the rotation of the latter is transmitted to the arm. The operation of these parts is as follows: During the forward movement of the sliding block 122, or toward the right as viewed in Fig. 1, the cam 161 will operate to raise the arms 170 and 196, allowing the vertical rod 190 to rise and the arm 177 with its marking implement to descend upon the surface of the work. It will be noted that the lower portion or foot of the cam 161 is somewhat steep, which will cause a somewhat rapid rise of the roller 171 upon its first engagement therewith and allow a rapid descent of the marking implement; and the middle portion of said cam surface is made less steep in order to arrest the downward movement of the implement and allow it to descend slowly upon the stone. The remaining portion of the cam is again made steep in order that its further travel may raise the arm 196 entirely out of engagement with the vertical rod 190 and leave the implement free to follow irregularities in the surface of the stone. During the backward movement of the sliding block 122 or toward the left as viewed in Fig. 1 the cam 161 will permit the arm 170 to descend, thereby allowing the coil spring 172 to rotate the shaft 165 and the arm 196, which arm will operate to depress the vertical rod 190 and thus raise the arm 177 and withdraw its marking implement from the surface of the work. Screws 205, extending through horizontal slots in the cam plate 160 and into the block 122 serve to keep the former in place and permit of its horizontal adjustment relative to the slotted block, in order to provide for the proper engagement of the cam 161 with the cam roller.

Across the top of the frame member 100 is arranged a horizontal arm 210, to the end of which is jointed a vertical arm 211 having at its lower end a fixed brush 212, which is designed to brush the point of the marking implement at each upward movement of the latter and remove therefrom particles of material accumulated in its operation upon the stone.

Means are provided for automatically interrupting the current to the motor 18 at the end of the operation of the device; said means comprising a pair of horizontal feed rails arranged parallel to the rail 23, a collecting shoe carried by the carriage 24, and a switch on the collecting shoe, arranged to be opened at the end of the travel of the cross sliding carriage 98. The feed rails, indicated by 220, are laid in a strip of insulating material 221 attached by means of brackets 222 to the rail 23; and the current is collected by means of a sliding shoe 226, likewise of insulating material and formed with a bracketlike extension 227 which is secured to the flange 117 of the sliding carriage 24. In openings in the bottom of the shoe are placed brushes 230, 230, each being pressed yieldingly downward by a spring 231, 231, and into engagement with the rails; and on top of the shoe 226 is placed a knife switch 233, the two contact points of which are connected with the brushes through the springs 231. One of the rails is connected to the line wires and the other to the motor 18, the circuit being completed through the knife switch; whereby it will be seen that the opening of the knife switch will interrupt the current to the motor. Such opening is accomplished as follows: A horizontal trip bar 240 is arranged to extend entirely across the longitudinally sliding carriage 24, being journaled at one end in the journal member 167 above described, and at its other end in a bracket member 243 which is fixed to the flange 117 of the sliding carriage 24. Its outer end is provided with a fixed collar 245, and upon the part between its bearings is placed a loose collar 246 which may be adjustably fixed by means of a set screw 247. Upon one of the guide plates 198 which extend from the cross sliding carriage 98 is placed a small vertical post 249 arranged to engage with the collar 246 at a pre-determined point in the lateral movement of said carriage, according to the setting of the collar 246, and shift the trip bar longitudinally in its bearings; thereby causing the collar 245 to engage with the vertical arm 250 of the knife switch and open the latter. An additional fixed collar 252 is placed upon the trip bar to engage with the inner face of the bearing 243 and limit the sidewise shifting movement of said bar, in order to prevent it from being displaced from its bearings. A spring 253 is arranged to pull down upon the end of the arm 250 and open the switch quickly, after it has moved far enough to bring the spring past its pivot point, in order to prevent arcing.

In the operation of the device the cross-sliding carriage 24 is moved backward to the point of beginning of its travel by rotating the shaft 113, the pawl 154 being raised and held out of engagement with the ratchet wheel 120 to permit of such rotation. The lithographing stone or other material is then placed upon the table top and the adjustable collars 75 and 76 are adjusted on the shifting bar 60 to determine the proper length of stroke of the carriage 24 and accordingly the length of lines to be ruled. The pawls 89 and 90 are likewise adjusted according as it may be desired to begin each succeeding line in a perpendicular from the point of beginning of the first line; or to the right or left of such perpendicular; and the carriage 24 is then moved by hand to the left to the end of its stroke by rotating the screw 30. The belt 49 then being placed on the tight pulley 46 and the switch 233 closed, the traveling carriage will begin its travel; the movement of the screw 30 having first, however, shifted the sliding block 130 and the slotted block 122 in the traveling carriage to cause the marking implement to be lowered upon the work. At the end of the stroke the engagement of the carriage with one of the springs 78 will shift the bar 60 with its tubular extension 62 and through it the belt shifting devices to place the belt 48 upon the tight pulley and reverse the direction of rotation of the screw 30; such reversal operating first to slide the loose block 130 and raise the rack bar 134 into engagement with the ratchet wheel 120, then to slide the slotted block 122 to raise the marking implement and rotate the ratchet wheel 120, moving the cross-sliding carriage 98 along its rail; and further rotation of said screw will move the traveling carriage back to its point of beginning and in position for a succeeding stroke—the operation continuing until the cross movement of the carriage 98 has tripped the trip bar 240 and opened the switch.

The pulleys 50 and 51 are proportioned as shown in order that the carriage 24 may be moved slowly forward through its marking stroke by the small pulley, and may be quickly returned by the large pulley.

I claim as my invention:

1. In a ruling machine, a traveling carriage, a sliding block mounted therein and provided with a rack bar, and means for raising the latter into its operative position and allowing it to fall back.

2. In a ruling machine, a traveling carriage and means for actuating the same, a reciprocally moving bar adapted for engagement by said carriage, and means for increasing the distance of travel of said bar on successive strokes in either direction, and equally decreasing its distance of travel on successive strokes in the opposite direction.

3. In a ruling machine, a traveling carriage, a rotating screw for actuating the same, means for reversing the direction of rotation of said screw, a reciprocally moving bar for actuating said means, and means for increasing the distance of travel of said bar on successive strokes in either direction, and equally decreasing its distance of travel on successive strokes in the opposite direction.

4. In a ruling machine, a reciprocally traveling carriage, a reciprocally movable shifting bar adapted for engagement therewith, and means for periodically varying the position of said bar with respect to the path of travel of said carriage.

5. In a ruling machine, a traveling carriage, a shifting bar adapted for engagement therewith, a part carried by said bar and movable therewith, means operating through the movement of said part to rotate the same, and means operating through the rotation of said part to vary the position of said bar in the direction of travel of said carriage.

6. In a ruling machine, a traveling carriage and means for actuating the same, a reciprocally moving bar adapted for engagement by said carriage, and means for progressively displacing in either direction the path of movement of said bar to successively advance its point of farthest travel in one direction and equally limit the distance of its return in the opposite direction.

7. In a ruling machine, a reciprocally moving carriage carrying a marking device, and means for progressively displacing in either direction the path of movement of said carriage to successively advance its point of farthest travel in one direction and equally limit the distance of its return in the opposite direction.

8. In a ruling machine, a traveling carriage, a non-rotative shifting bar adapted for engagement therewith, a sleeve in threaded engagement with said bar, a rotative cylinder upon said sleeve, a spiral groove in said cylinder and a stationary part engaging therewith whereby the reciprocal longitudinal movement of said cylinder rotates the same, and means for imparting rotation from said cylinder to said sleeve.

9. In a ruling machine, a traveling carriage, and means for operating the same, a reciprocally movable bar adapted for engagement with said carriage to control said operating means, and means for progressively displacing the path of movement of said bar in a continuous direction to continuously vary the path of movement of said traveling carriage.

10. In a ruling machine, a reciprocally moving carriage, means for operating the same and for reversing the direction of movement at the end of each stroke, a reciprocally moving bar for controlling said means, adjustable stops on said bar for engagement by such carriage, and means for increasing the distance of travel of said bar on successive strokes in either direction, and equally decreasing its distance of travel on successive strokes in the opposite direction.

11. In a ruling machine, a longitudinally moving carriage and a transversely moving carriage, a threaded transverse shaft for actuating said latter carriage, a sliding block and a relatively movable rack bar in said longitudinally moving carriage, cam surfaces on such parts, and a ratchet wheel on said threaded transverse shaft for engagement by said rack bar.

12. In a ruling machine, a longitudinally moving carriage and a transversely moving carriage, a threaded transverse shaft for actuating said latter carriage, a sliding block and a relatively movable rack bar in said longitudinally moving carriage, cam surfaces on such parts, a ratchet wheel on said threaded transverse shaft for engagement by said rack bar, and a hook on said rack bar.

13. In a ruling machine, a reciprocally moving carriage, and a non-rotative shifting bar for controlling the same, a sleeve in threaded engagement with such bar, a cylinder on such sleeve, means for reciprocally rotating said cylinder, and means for imparting rotation in either direction from said cylinder to said sleeve.

14. In a ruling machine, a reciprocally moving carriage, and a non-rotative shifting bar for controlling the same, a sleeve in threaded engagement with such bar, a cylinder on such sleeve, means for reciprocally rotating said cylinder, and ratchets on one of such parts and oppositely engaging pawls on the other.

15. In a ruling machine, a reciprocally moving carriage carrying a marking device and means for increasing its distance of travel on successive strokes in either direction, and equally decreasing its distance of travel on successive strokes in the opposite direction.

16. In a ruling machine, a reciprocally movable carriage carrying a marking device, and means for continuously advancing the points of farthest travel of said carriage in either direction.

In witness whereof, I have hereunto subscribed my name in the presence of two witnesses this 4th day of October 1911.

NORBERT WM. von HOLDT.

Witnesses:
S. D. HIRSCHL,
L. E. CHRISTIANSON.

Copies of this patent may be obtained for five cents each, by addressing the "Commissioner of Patents, Washington, D. C."